Dec. 3, 1968

H. C. KELLY, JR 3,414,481

EDUCTION DISTILLATION SYSTEM FOR TREATING
SALT WATER TO PRODUCE FRESH WATER

Filed Oct. 22, 1965

INVENTOR.
HERBERT C. KELLY, JR.
BY
Knox & Knox

United States Patent Office 3,414,481
Patented Dec. 3, 1968

3,414,481
EDUCTION DISTILLATION SYSTEM FOR TREATING SALT WATER TO PRODUCE FRESH WATER
Herbert C. Kelly, Jr., 5222 Cromwell Court, San Diego, Calif. 92116
Filed Oct. 22, 1965, Ser. No. 500,552
8 Claims. (Cl. 202—234)

ABSTRACT OF THE DISCLOSURE

This is a system for raising water, for example, from the surface of a body of naturally occurring water up a nearby hillside to a condenser and storage means at the top. The water is raised in the form of vapor continuously and progressively heated and accelerated as its rises.

---

Figure 1:
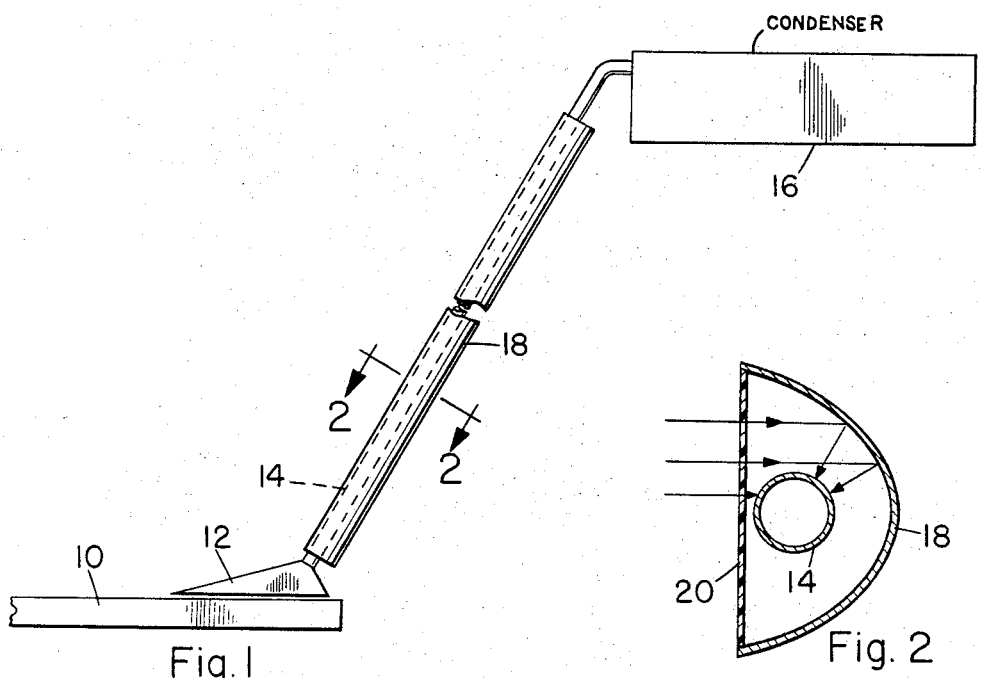

The present invention is related to distillation and specifically to an eduction distillation system.

Most large volume distillation systems for producing fresh water from salt water use considerable amounts of power to heat the water, which must then be pumped to a storage location or distribution facility. Solar heated systems use large areas of reflectors and heat absorbing surfaces and are not capable of high volume production, the fresh water produced still requiring pumping for storage or distribution.

The primary object of this invention is to provide an eduction and distillation system utilizing solar heated eduction means to carry water vapor from an evaporation bed to a condenser, without the need for special power sources or mechanism of any type.

Another object of this invention is to provide an eduction distillation system which will carry and lift water vapor for considerable distances without pumping means, allowing condensed fresh water to be stored in an elevated container or reservoir from which distribution can be made by gravity flow.

Another object of this invention is to provide an eduction system capable of maintaining a large volume flow, even with less than maximum solar heating effect.

A further object of this invention is to provide an eduction system which is adaptable to many different types of installations, or can be constructed to suit particular terrain, using various sources of water, evaporating and condensing means and distillate storage facilities.

Figure 2:
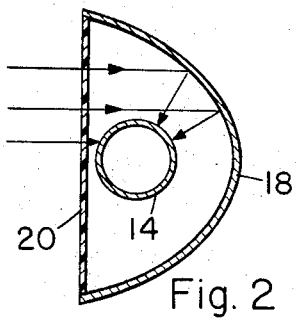
Figure 3:
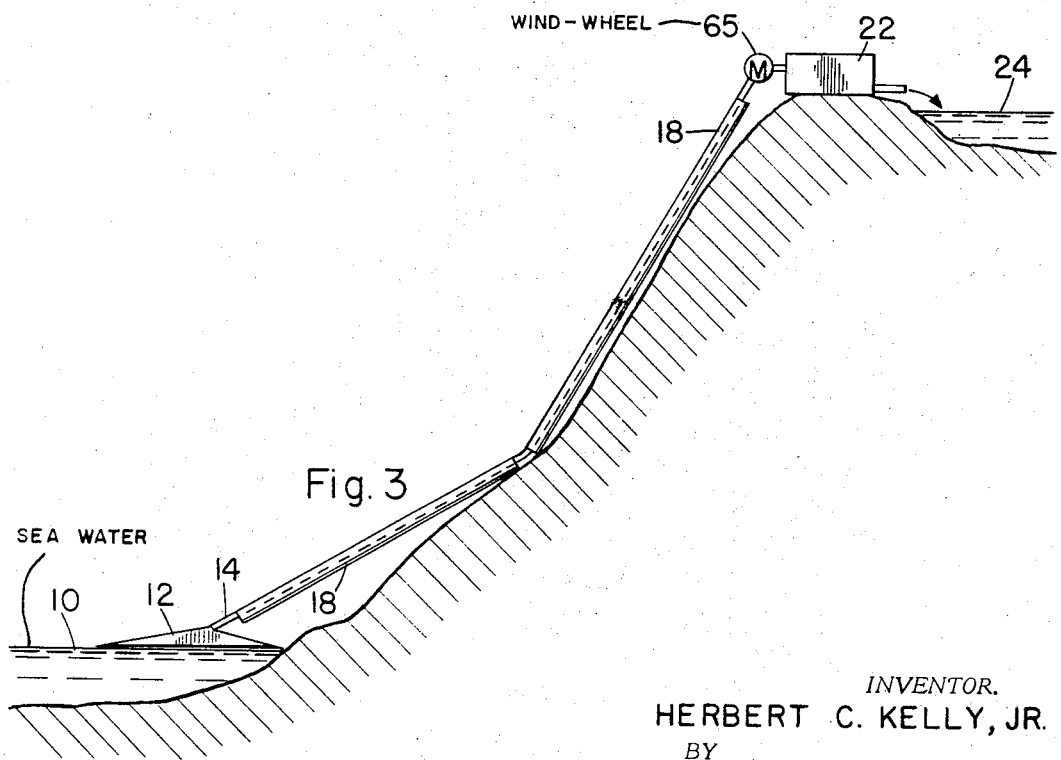
Figure 4:
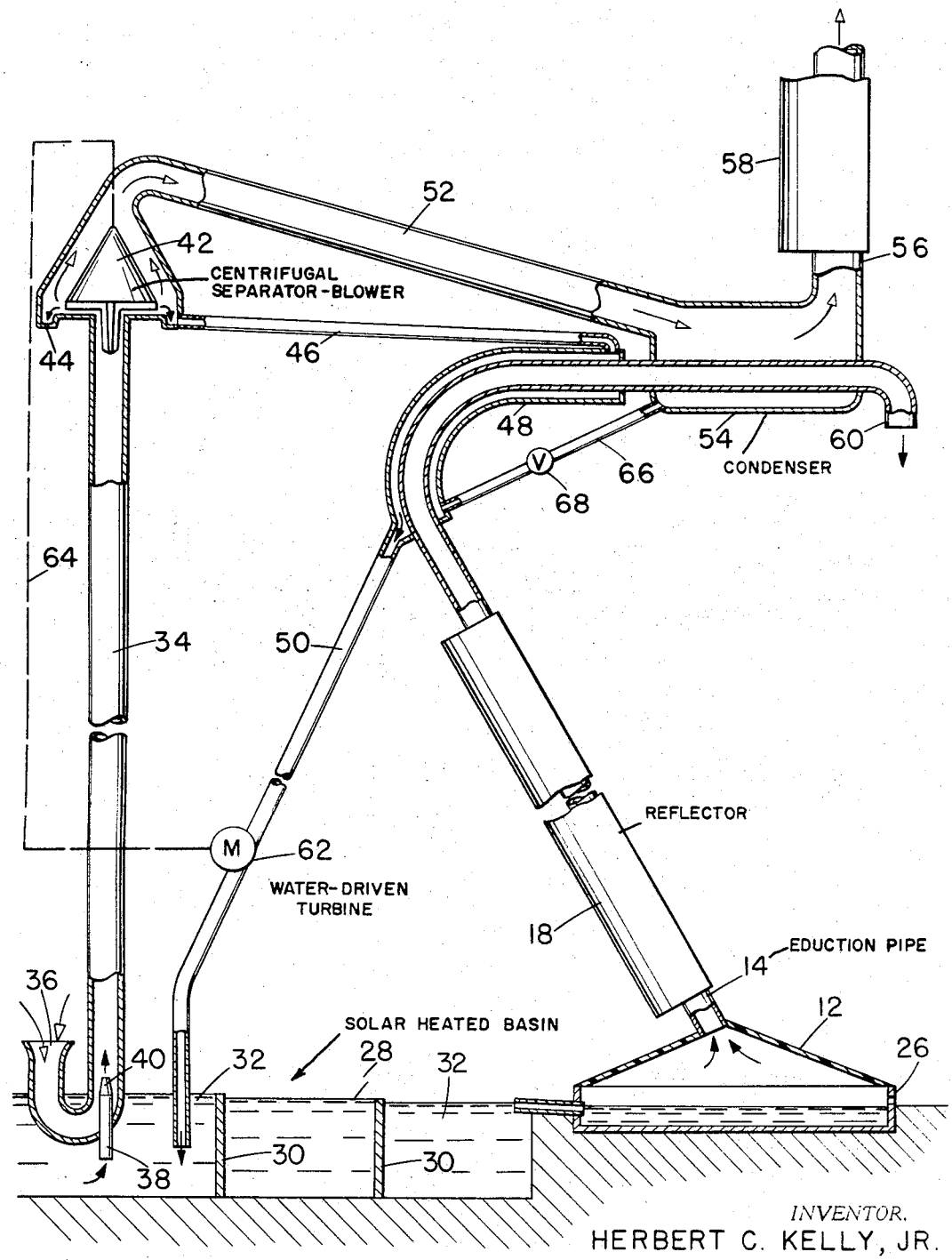

The basic system and its adaptation are shown in the drawings, in which:

FIGURE 1 is a diagram of the basic system;
FIGURE 2 is an enlarged sectional view taken on line 2—2 of FIGURE 1;
FIGURE 3 is a diagram of the system adapted to local terrain; and
FIGURE 4 is a diagram, partially in section, of a complete system with suitable evaporation and condensing means.

The basic system of FIGURE 1 includes an evaporation bed 10, containing salt water or otherwise contaminated water to be distilled, with a hood type collector 12 suspended over at least a portion of the evaporation bed. From the top of the collector 12 an eductor pipe 14 rises to a condenser and storage unit 16. The eductor pipe 14 is positioned for exposure to solar energy and is provided with a reflector 18 along its length to concentrate heat on the pipe. Reflector 18 may be parabolic, arcuate or otherwise shaped in cross section and may be enclosed by a transparent cover 20 to trap the heat produced when the solar energy is reflected. If necessary the reflector may be driven to track the sun, such devices being well known, although the efficiency of the system has been found to be high even with less than optimum solar heating.

The evaporation bed 10 can be a tray or pan, a large tank, or a natural body of water. Collector 12 may be made from metal so that the interior is heated by inward radiation, or can be of transparent material to admit solar energy which is then trapped as heat. The condenser and storage unit 16 may be a tank with condenser means incorporated therein, or could be constructed as a separate condenser 22 emptying into a natural or excavated reservoir 24, as in FIGURE 3. The collector 12 may be of large area and may be supported above the water by a fixed framework, a floating framework or individual floats. In this installation the eductor pipe 14 is run in sections to suit terrain contours and may rest on the surface or be supported by any suitable structure. The arrangements fits well to a hill or cliff adjacent a body of water, with an elevated reservoir at the top. If storage is not required, conduits or other utilization means may be used to handle the condensate.

Operation of the system relies on the eduction effect of air or other fluid in a pipe which is higher at one end than at the other. If the fluid is rarified or made lighter by any means, such as heat, the fluid will tend to rise in the pipe and be replaced by ambient air entering at the lower end. Considerable velocity and mass flow can be obtained with even a small density or temperature differential along the pipe, the physical effect being well known. By means of solar heating high temperatures can be reached within the pipe, the heating being accumulative as the air moves through the pipe and being enhanced by the reflector. In the collector 12 the water vapor existing adjacent the surface of the water will be carried along with the moving column of air, the vapor being substantially pure or distilled. At the top of the eductor pipe the vapor laden air is passed through suitable condensing means and the resultant condensed, distilled water deposited in the storage receptacle.

For maximum efficiency it would be desirable to match the capacity of the evaporation and collection means and the capacity of the condensing means to the flow capacity of the eductor pipe under normal prevailing conditions. In hot desert regions where the system is most feasible, solar energy is reasonably constant for long periods and maximum capability of the system can be realized. There are many regions where desert and mountains occur near an ocean, which is an ideal terrain for the system. Under such conditions the system will even operate to some extent at night, since dry desert air readily absorbs water vapor and a substantial temperature differential exists between the lower terrain retaining the heat of the day and the upper mountain region, which cools off rapidly.

It was found in tests with high solar heating that the vapor content of the rising air column would exceed the capacity of the condenser. If this should occur in a particular installation due to excess heating of very long runs of eductor pipe, whose diameter is dictated by practical considerations, portions of reflector could be omitted or parts of the eductor pipe insulated to achieve a balance. In one particular test a thin walled metal pipe 30 feet long and about 4.5 inches in diameter was supported at approximately 50 degrees to the horizontal. With the ends shielded from wind effects, the air flow through the pipe was measured at 7.5 miles per hour at the lower end and 10 miles per hours at the top, while the temperature increased from the ambient 70 degrees F. at the bottom to 180 degrees F. at the top. A generally parabolic metallized reflector was used on a major portion of the pipe.

While various evaporation and condensing means may be used, the system shown in FIGURE 4 is an example of a combination which is particularly effective when the eductor pipe run is not excessively long. In this arrangement the collector 12 is disposed over an evaporating pan 26 which is supplied with water from a bed 28 divided by barriers 30 into successively lower basins 32.

The upper layer of water, which is warmest, overflows from each basin into the next lowest and finally into the evaporating pan 26, so that maximum use is made of preheating by solar energy.

Extending upwardly from one basin 32 remote from the evaporating pan 26 is a lift pipe 34 having at its lower end an air intake 36. Immersed in the water is a pick-up tube 38 leading to a jet pump nozzle 40 within the lift pipe 34. The jet pump or aspirator structure is merely diagrammatic and would be properly designed for maximum efficiency in the installation. The upper end of lift pipe 34 terminates at a separator 42, which may be of the centrifugal or cyclone type and may be powered by the moving air column or by an external power source, depending on the capacities involved. An upward air flow is induced in the lift pipe 34, by means hereinafter described, and extracts water from nozzle 40 in droplets, which are carried along in the air stream. It is not necessary to heat the lift pipe since evaporation of the water is not required, but limited solar heating will not detract from the operation. At the separator 42 the water content is extracted and collected in a collector ring 44 from which a water conduit 46 extends to a water jacket 48 surrounding a portion of the upper end of eductor pipe 14. A return pipe 50 carries water from the jacket 48 back to the bed 28. Air from the separator 42 is led through an air conduit 52 to an air jacket 54 surrounding the upper end portion of eductor pipe 14. Air jacket 54 has an upwardly extending second eductor 56 which is solar heated and may be provided with a reflector 58, to provide rising airflow and act as a power source for the lift pipe action. The outlet end 60 of eductor pipe 14 leads to a distillate storage facility.

In operation the water and air obtained from the lift pipe 34 cool the upper portion of eductor pipe 14 and condense the water vapor therein. The entire operation of evaporation, raising the distilled water to an elevated storage and condensing the distillate, is thus performed by solar energy. In this system the lift pipe and return pipe would run generally together with the eductor pipe and could use common supports. If the length of run is excessive it may be more practical to use independent condensing means at the top of the eductor. However, the arrangement shown has an advantage, in that the head of water in return pipe 50 can be used to drive a power unit 62, such as a turbine, to provide useful power. This power could, in fact, be used to operate the separator 42, as indicated by the broken line connection at 64. In addition much of the heat absorbed by the water in jacket 48, from condensing the vapor in pipe 14, is returned to the bed 28 to warm the water therein. It will be evident that a highly efficient, self-contained system is possible and, due to the simplicity, is capable of continuous operation with little or no attention.

In certain installations the energy of the flow in the eductor pipe could be used to drive a suitable power unit, since the acceleration of the fluids may become very great and considerable volumetric flow at this high velocity provides a ready source of power which can be initially converted into mechanical power by a utilization device such as a windwheel of any suitable character, diagrammatically illustrated as a motor 65 in FIGURE 3. It should be noted in this regard that high temperatures will be encountered in the eductor pipe 14, especially near the upper end thereof, and the motor M or similar power utilization device employed at that location slows the flow and converts some of the energy of the swiftly moving hot fluid into useful power, the inherent cooling effect being complementary to that of the condenser 22.

The head of water in the elevated reservoir is available for subsequent use in power production during distribution. It is frequently the case that salts and other valuable condensates can be economically retrieved from the water especially at such stations as in the base of the air jacket 54. However, any unwanted accumulation of liquid here may be drained into the water jacket 48 through drain pipe 66 by opening valve 68.

It is understood that minor variation from the form of the invention disclosed herein may be made without departure from the spirit and scope of the invention, and that the specification and drawings are to be considered as merely illustrative rather than limiting.

I claim:

1. An eduction distillation system for lifting pure water up a hillside from a source at a lower level, comprising:
   a water vapor collector mounted above at least a portion of the water at a lower level for collecting relatively cool water vapor;
   an elongated eduction pipe and vapor heating and accelerating pipe extending generally upwardly on a hillside from said collector for at least partial exposure to the sun;
   condensing means comprising a lift pipe leading upwardly from said source of water, air aspirator means in said lift pipe, rotary separator means to separate liquid water from the water vapor and air at the top of said lift pipe, plural jackets around upper end portions of said eduction pipe connected respectively to the liquid water and air water vapor outlets of said separator means to condense water vapor in the upper end portions of said induction pipe; and
   a collector for the condensate.

2. A system according to claim 1 and including a covered reflector enclosing at least a portion of said eduction pipe to concentrate solar energy thereon.

3. A system according to claim 1, and including an evaporation bed at the source of water at the lower level having a plurality of barriers dividing the bed into adjacent basins, said barriers being of successively decreasing height, whereby the upper layer of water in each basin empties into the next lowest basin, said collector being disposed over at least a part of the lowest basin.

4. A system according to claim 1 wherein said separator means includes a centrifugal separator in the upper end of said lift pipe.

5. A system according to claim 1, wherein said flow inducing means comprises means to induce an upward air flow in said lift pipe, and pick-up means in said lift pipe communicating with the source of water to introduce water into the air flow.

6. A system according to claim 5 and including a water return pipe connecting said jackets to said source.

7. A system according to claim 1, wherein said flow inducing means in said lift pipe comprises a solar heated eductor extending upwardly from one of said jackets.

8. A system according to claim 1 and including windwheel means, connected with an upper end portion of said eductor pipe.

References Cited

UNITED STATES PATENTS

| | | | |
|---|---|---|---|
| 2,141,330 | 12/1938 | Abbot | 202—234 X |
| 2,342,201 | 2/1944 | Kain | 202—234 |
| 2,375,713 | 5/1945 | Weidner | 202—234 X |
| 2,975,107 | 3/1961 | Friedman | 202—234 X |
| 3,138,546 | 6/1964 | Muller | 202—205 |
| 3,140,986 | 7/1964 | Hubbard | 202—234 X |
| 3,257,291 | 6/1966 | Gerber | 202—234 |
| 3,290,230 | 12/1966 | Kobayashi | 202—234 |
| 3,300,393 | 1/1967 | Fisher | 203—10 |
| 1,544,029 | 6/1925 | Nelson | 203—10 X |
| 3,338,797 | 8/1967 | Hermansen et al. | 202—234 |

FOREIGN PATENTS 442,502  11/1948  Italy.

NORMAN YUDKOFF, Primary Examiner.

F. E. DRUMMOND, Assistant Examiner.